US 8,539,135 B2

(12) United States Patent
Kabra et al.

(10) Patent No.: US 8,539,135 B2
(45) Date of Patent: Sep. 17, 2013

(54) ROUTE LOOKUP METHOD FOR REDUCING OVERALL CONNECTION LATENCIES IN SAS EXPANDERS

(75) Inventors: Nitin Kabra, Maharashtra (IN); Gurvinder Singh, Maharashtra (IN)

(73) Assignee: LSI Corporation, San Jose, CA (US)

( * ) Notice: Subject to any disclaimer, the term of this patent is extended or adjusted under 35 U.S.C. 154(b) by 195 days.

(21) Appl. No.: 13/106,208

(22) Filed: May 12, 2011

(65) Prior Publication Data

US 2012/0290762 A1 Nov. 15, 2012

(51) Int. Cl.
G06F 13/00 (2006.01)
H04L 12/56 (2011.01)
G06F 13/40 (2006.01)

(52) U.S. Cl.
CPC ............ H04L 45/00 (2013.01); *G06F 13/4022* (2013.01)
USPC ........................ 710/316; 709/238; 370/395.31

(58) Field of Classification Search
USPC .......................................................... 710/305
See application file for complete search history.

(56) References Cited

U.S. PATENT DOCUMENTS

| | | | | |
|---|---|---|---|---|
| 7,028,106 B2* | 4/2006 | Foster et al. | | 710/2 |
| 7,035,952 B2* | 4/2006 | Elliott et al. | | 710/300 |
| 7,286,534 B2 | 10/2007 | Kloth | | |
| 7,334,042 B2* | 2/2008 | Day et al. | | 709/230 |
| 7,584,319 B1* | 9/2009 | Liao et al. | | 710/317 |
| 7,630,373 B2* | 12/2009 | Okuno | | 370/392 |
| 7,664,896 B2* | 2/2010 | Galloway | | 710/105 |
| 7,685,350 B2* | 3/2010 | Duerk et al. | | 710/306 |
| 7,808,971 B2* | 10/2010 | Miller | | 370/351 |
| 7,882,281 B2 | 2/2011 | Jones et al. | | |
| 7,984,183 B2* | 7/2011 | Andersen et al. | | 709/244 |
| 8,095,722 B1* | 1/2012 | Liao et al. | | 710/317 |
| 8,255,607 B2* | 8/2012 | Jones et al. | | 710/316 |
| 2005/0066100 A1* | 3/2005 | Elliott et al. | | 710/300 |
| 2005/0125574 A1* | 6/2005 | Foster et al. | | 710/36 |
| 2006/0039406 A1* | 2/2006 | Day et al. | | 370/469 |
| 2006/0041672 A1* | 2/2006 | Day et al. | | 709/230 |
| 2006/0041699 A1* | 2/2006 | Day et al. | | 710/106 |
| 2010/0215041 A1* | 8/2010 | Petty | | 370/392 |

* cited by examiner

Primary Examiner — Ryan Stiglic
(74) Attorney, Agent, or Firm — Suiter Swantz pc llo

(57) ABSTRACT

A system and method for reducing overall connection latencies in a SAS expander is disclosed. The SAS expander includes a plurality of ports and a route lookup table configured for providing a central resource for routing information for the ports. The SAS expander also includes a plurality of connection history caches (CHCs) associated with the ports, each CHC is configured for storing at least one successfully established connection record. Upon receiving a connection request at a particular port, that particular port may determine whether a matching connection record for the connection request is stored in its corresponding CHC. If the matching connection record is stored in its corresponding CHC, a connection may be established in response to the connection request based on the matching connection record. However, if no matching connection record is found in its corresponding CHC, the connection may be established utilizing the route lookup table.

17 Claims, 2 Drawing Sheets

ROUTE LOOKUP METHOD FOR REDUCING OVERALL CONNECTION LATENCIES IN SAS EXPANDERS

TECHNICAL FIELD

The present invention relates to the field of storage devices and particularly to a system and method for reducing overall connection latencies in SAS expanders.

BACKGROUND

Serial Attached SCSI (SAS) is a computer bus used to move data to and from devices such as hard drives and tape drives. A typical SAS system may include one or more initiators and one or more target devices. Certain SAS systems with large numbers of devices may utilize SAS expanders to facilitate communications between the initiators and various target devices.

A typical SAS expander may include two or more ports for establishing communications between two or more devices (e.g., between an initiator and a target). A routing table (e.g., implemented utilizing a Content-Addressable Memory, or CAM) may be used to keep information about which SAS address can be accessed via which port of the expander. For example, when an OPEN address frame (OAF) is received on one port of the expander, the expander may perform a routing table lookup to find on which phy the OPEN address frame should be routed to. The routing table may have one entry per SAS address, which means that the number of table entries needed for a given topology may increase linearly with respect to the size of the topology. Increasing the routing table size may slow down its lookup speed.

Furthermore, conventional expander systems may utilize one central routing table. As the number of ports increases, the numbers of simultaneous routing table lookup requests may increase drastically. Since these requests need to be prioritized and processed one at a time, the overall connection latencies for requesting resources may be increased as a result. Therefore, the conventional expanders based solely on central routing tables are not scalable to support port number increases without affecting connection latencies.

SUMMARY

Accordingly, an embodiment of the present disclosure is directed to a SAS expander utilizing a plurality of connection history caches (CHCs) to reduce overall connection latencies. The SAS expander includes a plurality of ports and a route lookup table configured for providing a central resource for routing information for the plurality of ports. The SAS expander also includes a plurality of CHCs. Each of the plurality of CHCs is associated with one of the plurality of ports, and each of the plurality of CHCs is configured for storing at least one successfully established connection record. Upon receiving a connection request at a particular port of the plurality of ports, the particular port may determine whether a matching connection record for the connection request is stored in the CHC associated with the particular port. If the matching connection record is stored in the CHC associated with the particular port, a connection may be established in response to the connection request based on the matching connection record. However, if the matching connection record is not stored in the CHC associated with the particular port, the connection may be established in response to the connection request utilizing the route lookup table.

A further embodiment of the present disclosure is directed to a routing method for a SAS expander. The SAS expander may include a plurality of ports, and at least one port of the plurality of ports may be associated with a connection history cache (CHC). The routing method may comprise storing at least one successfully established connection record in the CHC; receiving a connection request at the at least one port; determining whether a matching connection record for the connection request is stored in the CHC; establishing a connection in response to the connection request based on the matching connection record when the matching connection record is stored in the CHC; and establishing the connection in response to the connection request utilizing a central route lookup table when the matching connection record is not stored in the CHC.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
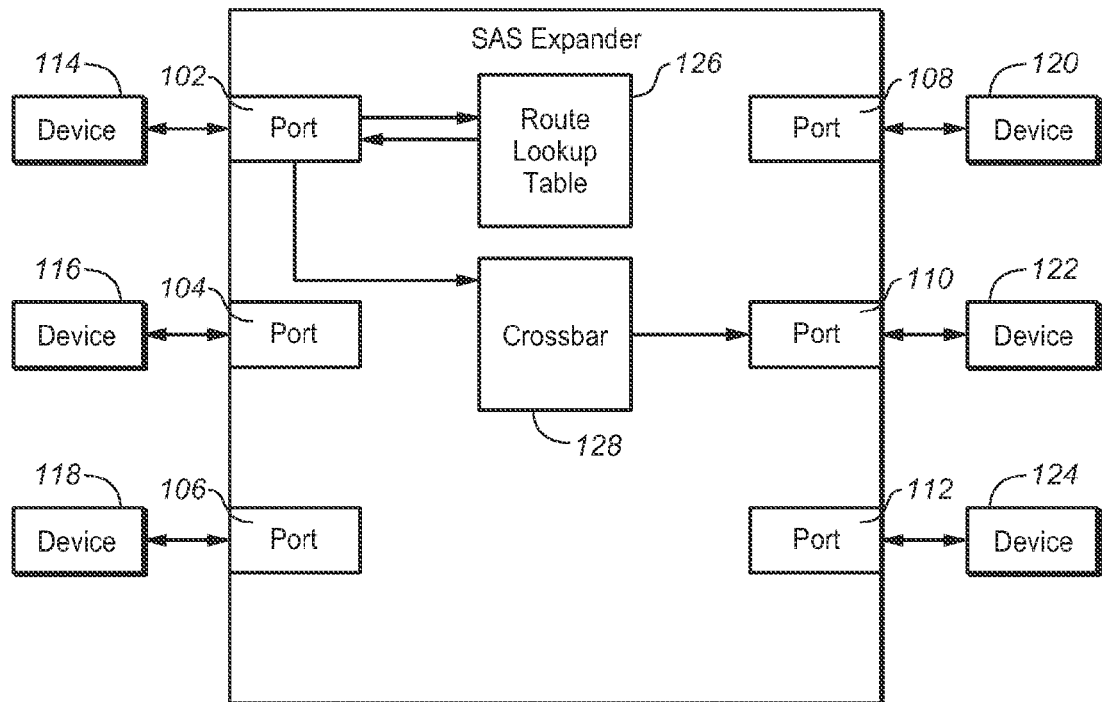
FIG. 1 is a block diagram illustrating a routing process of a conventional SAS expander.

Referring to FIG. 1, a block diagram illustrating a conventional SAS expander 100 is shown. The SAS expander 100 may include multiple expander ports for connecting with various devices. Such devices may include initiators/hosts, target devices/drives, other SAS expanders or the like. For illustrative purposes, the exemplary SAS expander 100 depicted in FIG. 1 includes six ports (port 102 through port 112) for connecting with six end devices (device 114 through device 124). Furthermore, for illustrative purposes, device 114 and 116 may represent initiators while other devices may represent target devices.

As an example, for device 114 to request connection to device 122 utilizing the conventional SAS expander 100, device 114 may first send a connection request to port 102. Port 102 may be referred to as the source address port for this connection request, and upon receiving the request from device 114, port 102 may request for a search of possible route(s) between device 114 and device 122 in a route lookup table 126. Once the search is completed, the possible route(s) may be provided to port 102, and port 102 may then request the central connection manager (crossbar) 128 to establish connection between port 102 and port 110 based on the search result. Port 110 may be referred to as the destination address port for this connection request, and once the connection between port 102 and port 110 is established by the central connection manager 128, port 102 may forward the connection request sent from device 114 to device 122 via port 110. Device 122 may accept the connection request and the connection between device 114 and device 122 may be successfully established.

As illustrated in the example above, the route lookup table 126 may provide a central resource for routing information for the devices connected to the SAS expander 100. However, it is noted that searching for possible routes in the route lookup table 126 may be time consuming. In addition, other ports may also be simultaneously requesting for route lookups, which may increase the overall lookup Latency. In order to reduce the lookup latency, memory devices such as Content-Addressable Memory, or CAM may be utilized to implement the route lookup table 126. However with increased number of ports provided by the expander, it may not be feasible to increase the route lookup logic speed along with the CAM due to design complexities and physical restrictions. Therefore, a mechanism for mitigating the bottleneck caused by the route lookup table 126 may be appreciated.

The present disclosure is directed to a system and method for reducing overall connection latencies in SAS expanders. In addition to the route lookup table, an exemplary SAS expander in accordance with the present disclosure may include a connection history cache (CHC) associated with each port of the SAS expander. The CHC associated with each port may store a number of connection records locally at the port, which may allow the port to retrieve routing information locally without requesting for searches from the route lookup table.

Figure 2:
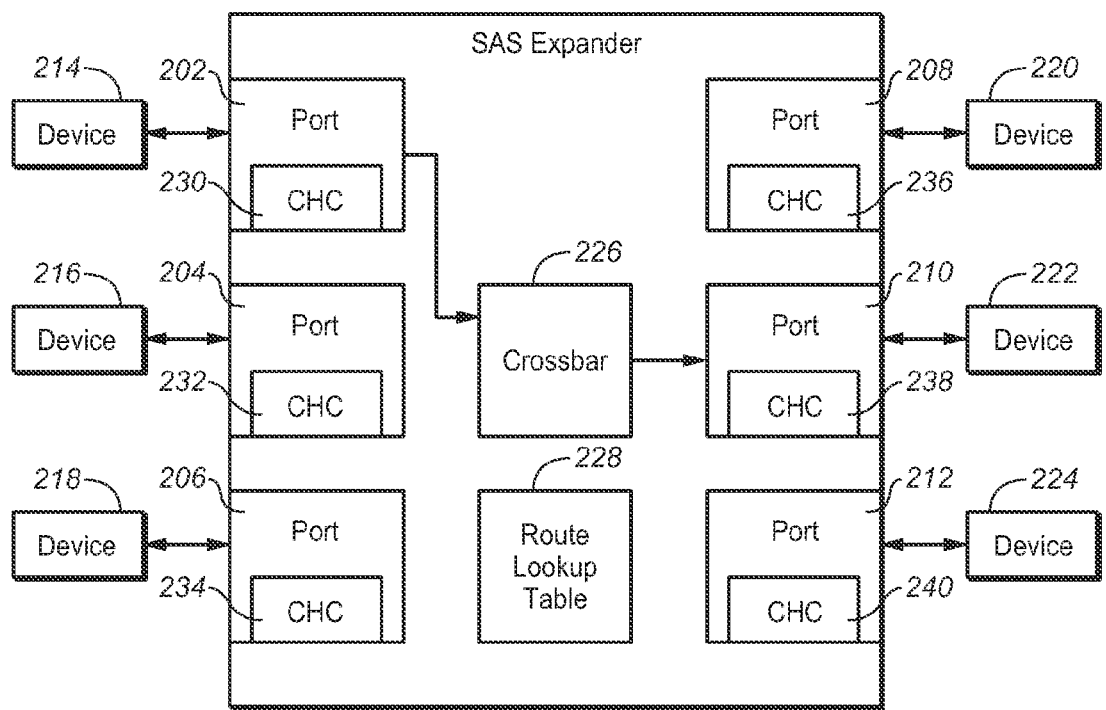
FIG. 2 is a block diagram illustrating a routing process of a SAS expander in accordance with the present disclosure.

Referring to FIG. 2, a block diagram illustrating a SAS expander 200 in accordance with the present disclosure is shown. The SAS expander 200 may include multiple expander ports for connecting with various devices. Such devices may include initiators, target devices, other SAS expanders or the like. For illustrative purposes, the SAS expander 200 depicted in FIG. 2 includes six ports (port 202 through port 212) for connecting with six end devices (device 214 through device 224). Furthermore, for illustrative purposes, device 214 and 216 may represent initiators while other devices may represent target devices.

In one embodiment, each port of the SAS expander 200 is associated with a connection history cache (CHC). Each CHC is configured for storing one or more successfully established connection records. In this manner, for device 214 to request connection to device 222, device 214 may send a connection request to port 202. Upon receiving the connection request, port 202 may first determine if the current connection request matches with any connection record already stored in its local CHC 230. If a matching connection record is found in CHC 230, then port 202 may skip searching for possible routes from the route lookup table 228 and directly request the central connection manager (crossbar) 226 to establish connection between port 202 and port 210 based on the matching connection record found in CHC 230. On the other hand, if no matching connection record is found in CHC 230, port 202 may request for a search of possible routes between device 214 and device 222 in the route lookup table 228 and request to establish the connection similar to the conventional routing method as described above.

The connection history cache 230 through 240 may be empty initially and then start to record connection records and parameters related to successful connections as they are being established. For example, once a successful connection is established between a source address port and a destination address port, the destination device (device 222 in the example above) may send an accept signal (e.g., an "OPEN ACCEPT" confirmation) to the source device (device 202 in the example above). Such an accept signal may be seen by the expander ports along the connection route, and the expander ports may record the connection information into their CHCs accordingly. The recorded information may then be used for future connection requests between the same source and destination devices.

To provide fast access time, it is contemplated that the memory size of each particular CHC may be very small and each CHC may have limited number of entries. Small cache size may still provide adequate caching of the connection records because similar connection requests between devices (e.g., from an initiator to a target drive or vice versa) are typically requested within a small window of time. In addition, the number of initiators in a SAS topology is typically significantly lower than the number of target devices, therefore connection requests originated from target devices to initiators are typically limited to only a small number of destination address ports. Such behaviors allow small caches to be utilized to store the most frequent connections within a short window of time while still provide adequate caching to make the CHCs useful.

In one specific implementation, each particular CHC may store up to six connection records. An exemplary connection record (i.e., a CHC entry) stored in a CHC may have the following data structure:

| Data Field | Data Size |
| --- | --- |
| Validity Bit | 1 bit |
| Available Phy List | 1 bit |
| Zone Group Information | 8 bits |
| Connection Rate | 2 bits |
| Device Name | 64 bits |

Where the Validity Bit may represent whether the CHC entry is valid; the Available Phy List may represent whether any phy is available in the expander to be used as means to route the connection request to the destination (typically this will be set as soon as a connection entry is made in CHC because of any successful connection and that connection entry is being updated in the CHC); the Zone Group Information, when zoning is enabled, may represent destination zone group of the phy through which the connection request will be routed in this expander in order to perform the zoning checks before forwarding the connection request to the expander phy and eventually to end destination device; and the Connection Rate may represent the logical rate at which connection is being requested.

The Device Name recorded for a particular connection may be determined based on whether the expander port (at which this CHC entry is stored) is the source port or the destination port. That is, if the expander port is the source port (port 202 in the connection established in the above example), the Device Name stored in this CHC entry may represent the World Wide Name (WWN) of the destination device (device 222 in the above example). Otherwise, if the expander port is the destination port (port 210 in the connection established in the above example), the Device Name stored in this CHC entry may represent the WWN of the source device (device 214 in the above example). It is understood that the restriction of six connection records per CHC and the data structure described above are merely exemplary. Various other data structures may be utilized without departing from the spirit and scope of the present disclosure, as long as they provide sufficient information for the expander port to obtain routing information locally.

Figure 3:
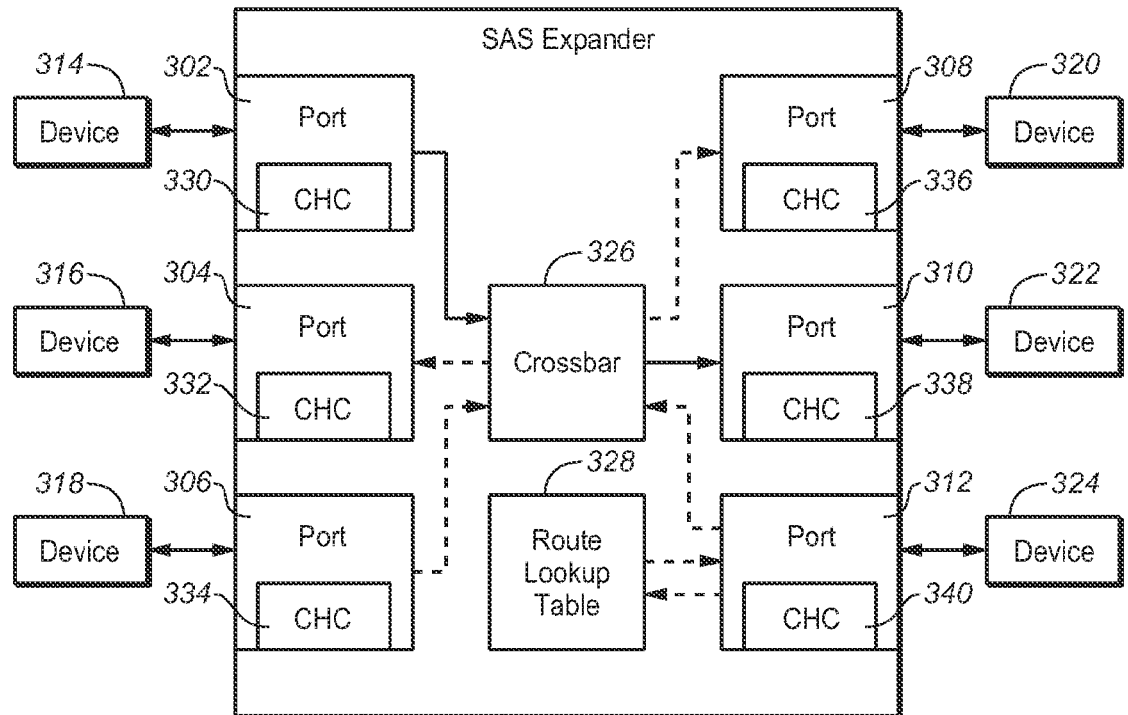
FIG. 3 is a block diagram illustrating the routing process of the SAS expander in accordance with the present disclosure, where multiple connection requests are being processed simultaneously.

While the example illustrated in FIG. 2 shows the routing process for only one connection request, it is contemplated that the SAS expander in accordance with the present disclosure may simultaneously process multiple connection requests, and that utilizing the CHCs to facilitate routing may improve the overall route lookup search time. Referring to FIG. 3, a block diagram illustrating a SAS expander 300 in accordance with the present disclosure is shown. For illustrative purposes, the SAS expander 300 depicted in FIG. 3 includes six ports (port 302 through port 312) for connecting with six end devices (device 314 through device 324).

For example, suppose device 314, device 318 and device 324 simultaneously request connections with device 322, device 320 and device 316, respectively. Upon receiving the connection requests, each of port 302, port 306 and port 312 may independently check to see if the connection request it receives matches with any connection record already stored in its local CHC (i.e., CHC 330, CHC 334 and CHC 340, respectively). Suppose that port 302 and port 306 both find their respective matching connection records in their respective CHCs, then both port 302 and port 306 may skip searching for possible routes from the route lookup table 328 and directly request the central connection manager (crossbar) 326 to establish the requested connections based on their respective matching connection records. However, suppose port 312 fails to find a matching connection record in CHC 340 for the connection request received from device 324, port 312 may subsequently request for a search of possible routes between device 324 and device 316 in the route lookup table 328. The connection between device 324 and device 316 may then be establish in a manner similar to that utilized in a conventional routing process as previously described.

As illustrated in the example above, utilizing CHCs for storing connection records/histories locally at each port helps reducing the overall lookup latency. That is, the number of route lookup requests that needs to be processed at the route lookup table 328 may be reduced utilizing the CHCs of the present disclosure. Furthermore, once the connection is successfully established between device 324 and device 316, for example, this connection record may be stored in CHC 340 and CHC 332 and may be utilized as references for future requests. In this manner, if device 324 subsequently sends another request to connect with device 316 again, port 312 may now find a matching connection record in CHC 340 and directly request the central connection manager (crossbar) 326 to establish the requested connection without searching through the route lookup table 328.

Generally, once a connection record is stored into a CHC, the connection record may stay valid and may be invalidated only when certain condition occurs. For example, a master system reset may clear all CHC entries. In another example, when a CHC becomes full, a new entry may overwrite the oldest entry stored in the CHC. In addition, a change that occurs on the SAS topology (e.g., attachment of a new device, removal of an existing device or other events that may require a rediscovery of the topology) may also prompt a reset of the CHCs. It is contemplated that other event not specifically mentioned above may also cause certain CHC entries to be invalidated. For instance, a link reset or a link down event within a particular port may prompt this particular port to clear its CHC entries.

It is contemplated that the CHCs locally accessible to the expander ports may help to relax the speed requirement expected from the route lookup table. Furthermore, the SAS expander in accordance with the present disclosure may utilize a larger route lookup table to support greater number of devices in the SAS domain, therefore providing support for large scale expanders without sacrificing on the overall performance or connection latencies.

It is also contemplated that the CHC associated with a particular expander port may be implemented as a set of parallel registers using flip-flop. Furthermore, the connection records stored in the CHC may be accessed by implementing parallel decoding and comparison logic to determine hit or miss. The CHC for each expander port may be configured as an integrated part of the expander port hardware. Alternatively, the CHC may be configured as a standalone or an add-on to existing expander port hardware.

It is further contemplated that while the examples depicted above may have indicated that every expander port in the SAS expander is configured to be associated with a CHC, such configurations are merely exemplary. That is, connection history caching may be utilized by a subset of the expander ports without departing from the spirit and scope of the present disclosure. Furthermore, the connection history caching in accordance with the present disclosure may be configured to support wide port configuration as well as various power management status of each individual SAS link.

Figure 4:
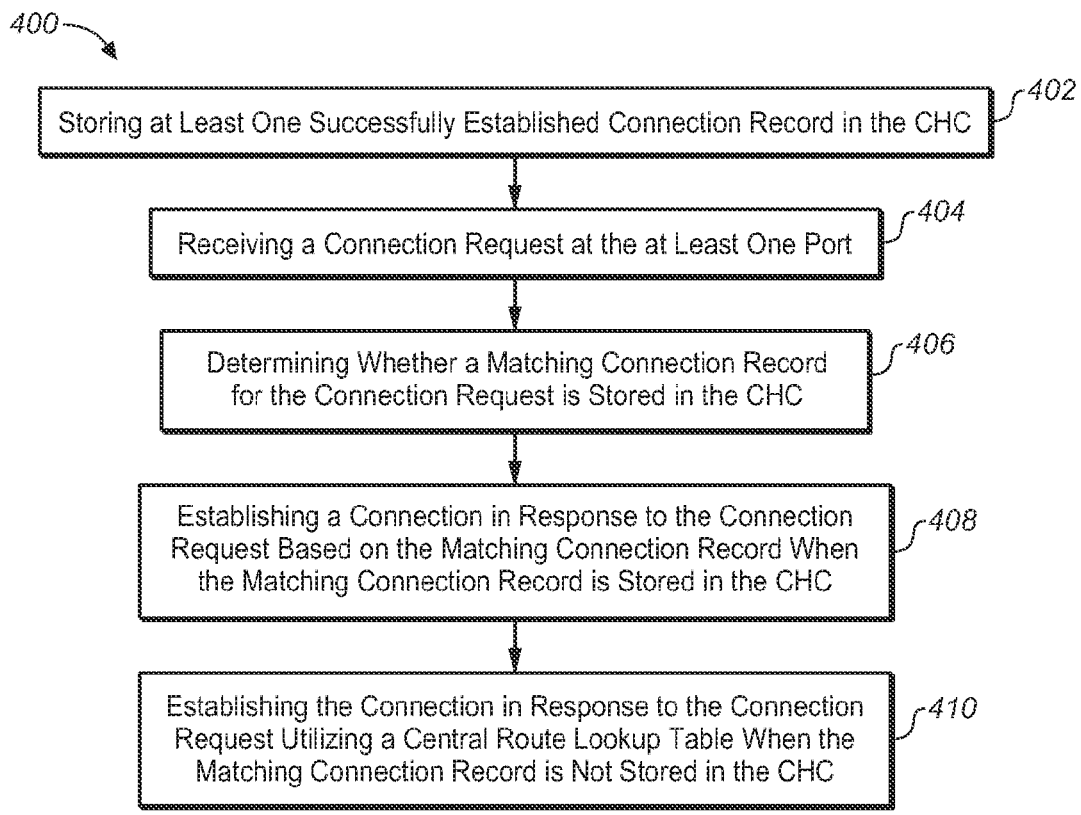
FIG. 4 is a flow chart illustrating a routing method in accordance with the present disclosure.

FIG. 4 shows a flow diagram illustrating steps performed by a routing method 400 for a SAS expander. The routing method 400 may be executed by a controller module, which may be implemented as firmware or software components that are configured for controlling the operations of the SAS expander and the expander ports.

In one embodiment, one or more ports of the SAS expander may be associated with a local connection history cache (CHC). For a particular port that is associated with a CHC, step 402 may store one or more successfully established connection records in the CHC of this port. Subsequently, when a connection request is received at this particular port in step 404, step 406 may determine whether a matching connection record for the connection request is stored in the CHC. If a matching connection record is found in the CHC, then step 408 may request the connection manager (crossbar) to establish a connection based on the matching connection record. Otherwise, if no matching connection record is found in the CHC, step 410 may utilize a central route lookup table to search for a possible route, and request the connection manager to establish the connection based on the possible route as described above.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A Serial Attached SCSI (SAS) expander, comprising:
a plurality of ports;
a centralized route lookup table, the centralized route lookup table configured for providing a central resource for routing information for the plurality of ports; and
a plurality of connection history caches (CHCs), each of the plurality of CHCs being configured as an integrated hardware component at one particular port of the plurality of ports, each of the plurality of CHCs configured for storing at least one successfully established connection record;
wherein upon receiving a connection request at a particular port of the plurality of ports, the particular port is configured for:
determining whether a matching connection record for the connection request is stored in the CHC associated with the particular port;
establishing a connection in response to the connection request based on the matching connection record when the matching connection record is stored in the CHC associated with the particular port; and
establishing the connection in response to the connection request utilizing the centralized route lookup table when the matching connection record is not stored in the CHC associated with the particular port.

2. The SAS expander of claim 1, wherein the CHC integrated with the particular port hardware is configured for storing up to six connection records.

3. The SAS expander of claim 1, wherein the CHC integrated with the particular port hardware is a local memory device.

4. The SAS expander of claim 3, wherein the CHC integrated with the particular port hardware comprises a set of parallel registers.

5. The SAS expander of claim 3, wherein upon a successful establishment of a connection between a source port and a destination port, the successfully established connection is stored in the CHCs integrated with the source port and the destination port, and each connection record stored in the CHC specifies an availability phy list, a zone group information, a connection rate, and a device name.

6. The SAS expander of claim 1, wherein the centralized route lookup table comprises a Content-Addressable Memory accessible by all of the plurality of ports.

7. A routing method for a Serial Attached SCSI (SAS) expander, the SAS expander including a plurality of ports, at least one port of the plurality of ports having a connection history cache (CHC), the routing method comprising:
providing a central route lookup table containing routing information for the plurality of ports;
storing at least one successfully established connection record in the CHC;
receiving a connection request at the at least one port;
determining whether a matching connection record for the connection request is stored in the CHC;
establishing a connection in response to the connection request based on the matching connection record when the matching connection record is stored in the CHC; and
establishing the connection in response to the connection request utilizing the central route lookup table when the matching connection record is not stored in the CHC.

8. The routing method of claim 7, wherein the CHC is configured for storing up to six successfully established connection records.

9. The routing method of claim 7, wherein the CHC is a local memory device configured as an integrated hardware component located on the at least one port.

10. The routing method of claim 9, wherein the CHC comprises a set of parallel registers.

11. The routing method of claim 9, wherein each one of the at least one successfully established connection record is stored in the CHC solely upon a connection through said at least one port is successfully established, wherein each one of the at least one successfully established connection record specifies an availability phy list, a zone group information, a connection rate, and a device name.

12. The routing method of claim 7, wherein each port of the plurality of ports is associated with a CHC.

13. A method for routing a connection request received at a Serial Attached SCSI (SAS) expander port, the method comprising:
providing a connection history cache (CHC) as an integrated hardware component of the SAS expander port;
storing at least one successfully established connection record in the CHC;
receiving the connection request at the SAS expander port;
determining whether a matching connection record for the received connection request is stored in the CHC;
requesting a connection manager to establish a connection based on the matching connection record when the matching connection record is stored in the CHC;
accessing a central route lookup table to identify a possible route when the matching connection record is not stored in the CHC; and
requesting the connection manager to establish the connection based on the possible route identified utilizing the central route lookup table when the matching connection record is not stored in the CHC.

14. The method of claim 13, wherein the CHC is configured for storing up to six successfully established connection records.

15. The method of claim 13, wherein the CHC is a local memory device located on the SAS expander port.

16. The method of claim 15, wherein the CHC comprises a set of parallel registers.

17. The method of claim 15, wherein each one of the at least one successfully established connection record is stored in the CHC solely upon a connection through said SAS expander port is successfully established, wherein each one of the at least one successfully established connection record specifies an availability phy list, a zone group information, a connection rate, and a device name.

* * * * *